United States Patent [19]

Fradella

[11] 4,085,355

[45] Apr. 18, 1978

[54] VARIABLE-SPEED REGENERATIVE BRUSHLESS ELECTRIC MOTOR AND CONTROLLER SYSTEM

[76] Inventor: Richard B. Fradella, 33872 Calle Conejo, San Juan Capistrano, Calif. 92675

[21] Appl. No.: 680,388

[22] Filed: Apr. 26, 1976

[51] Int. Cl.² .............................................. H02P 3/18
[52] U.S. Cl. .................................... 318/168; 318/171
[58] Field of Search ................ 318/138, 168, 169, 171

[56] References Cited

U.S. PATENT DOCUMENTS 3,584,276  6/1971  Ringland et al. .................... 318/171

*Primary Examiner*—Gene Z. Rubinson

[57] ABSTRACT

A synchronous polyphase motor is driven and regeneratively braked by relatively high-frequency power switching circuits that cause stator currents to vary sinusoidally with rotor position so the resultant magnetic field of the stator rotates with the rotor field at a constant optimum torque angle (leading for forward torque and lagging for reverse torque). The system includes a rotor position transducer that provides signals for each motor phase which vary sinusoidally with rotor angle for synchronous control of current in the associated stator winding, circuits to extract speed and direction, polarity, and relative amplitude from said signals, means to multiply said amplitudes by a variable which commands stator current levels, servo loops (each comprised of an operational amplifier, a pulse duration modulator, switching logic, and a current sensor) that control current in each stator winding in synchronism with rotor position and in response to forward drive, brake, and reverse drive commands and the commanded current levels; plus a circuit to adapt rotor excitation to stator current and motor speed, and an interlock including means to interpose regenerative braking whenever a motor drive command is received opposite to the motor rotation.

12 Claims, 6 Drawing Figures

4,085,355

VARIABLE-SPEED REGENERATIVE BRUSHLESS ELECTRIC MOTOR AND CONTROLLER SYSTEM

BACKGROUND OF THE INVENTION

This invention relates to electromechanical energy conversion devices, circuits that condition and control their electric power, means to detect and process their control signals, and composite configurations thereof that provide controlled motor and generator action as variable-speed regenerative brushless motor and controller systems.

Variable-speed brushless electric motor systems are known in the art that provide the high starting torque and control attributes of commutator motors without sliding commutators and their need for periodic maintenance, their friction, sparks which could be hazardous in explosive atmosphere, and their broadband radio interference. They are comprised of motors with polyphase wound stators that are provided variable-frequency commutated drive by power semiconductors, with various rotor types for synchronous and/or asynchronous operation.

Some brushless motor systems effect stator commutation by sequential switching of the stator windings, synchronized to the rotor angle or speed, which essentially causes the stator magnetic field to rotate stepwise. A practical limit to the number of stator windings and switching elements results in torque pulsations due to switching discontinuities, along with power loss and motor heating due to harmonic and reactive current. Also, tandem current regulators are required.

Other known systems incorporate switching regulators to generate sinusoidal polyphase stator voltages at variable amplitude and frequency; that variously include four-quadrant multipliers, nonlinear function generators, and phase or frequency compensation; with critical matching and adjustment of system parameters required to achieve reasonably acceptable power factor or slip frequency. Motor systems ranging from medium to high power incorporate thyristor switching regulators such as the McMurray inverter.

In principle, such systems circumvent the aforementioned torque pulsations, power losses, and heating of stepwise commutation. Moreover, current regulation can be accomplished by the same power switches which generate the polyphase voltages, so tandem regulation is not required.

However, if the intended sinusoidal polyphase currents from the inverters are substantially distorted, the possible advantages of such systems cannot be fully realized. Said distortion results from the motor voltage reaching that of the DC supply to the inverter, causing harmonic power losses in the motor and ripple current fed back to the supply line at relatively low frequencies which are dependent on motor speed and consequently not feasibly absorbed by power filter circuits. Additionally, slow thyristor switching necessitates compromises between power filter size vs. harmonic power losses in the motor vs. increased switching losses and unreliable commutation, and also restricts applications to systems with limited rotational speed. Furthermore, motors are sometimes reversed by operators while rotating at high speed; and unless the system incorporates safeguards for such operation, excessive power can be dissipated in wasted energy that may cause damage to the system. Also, the well known regenerative braking properties of the electric motor cannot be realized unless appropriate circuit conditions are provided.

Motor systems that are not subject to the aforementioned drawbacks and limitations would afford improvement to numerous useful applications, such as motive power for electric cars, buses, and trucks, mobile lifts and miscellaneous conveyances, servomechanisms in a wide range of sizes, motive devices for physically handicapped persons, and a wide variety of machine tools; and would facilitate broader application to systems requiring high rotational speed and negligible rotor heating, such as hermetically sealed and evacuated electrically coupled flywheel energy storage systems.

Therefore, an objective of this invention is to provide improved brushless motor and controller systems, with high starting torque and efficient drive and regenerative braking over a broad speed range, without torque discontinuities, with negligible power loss due to harmonic and reactive current in the motors, and especially negligible rotor losses.

Another objective is to reduce the size, power loss, and cost of reactive power filters for such motor and controller systems, and yet further reduce current and voltage ripple and peaks in the motors, controller circuits, and supplies.

Another objective is to provide reliable systems that do not require critical compensation, adjustment, and matching; so that unity power factor (and thus maximum torque for given currents and negligible losses from reactive currents) is inherently maintained over the entire motor speed and torque range without said compensation, adjustment, or matching.

Another objective is to provide motor and controller systems with adaptive control means that respond to all operator commands (including reversal at high speed, and full torque demand with locked rotor) effectively and efficiently, with inherent protection from damage.

To achieve these objectives, this invention provides circuit and system configurations that embody the following fundamental principles:

Firstly, this invention is based on the fundamental principle that orthogonal components $H_x = H_m \cos\theta$ and $H_y = H_m \sin\theta$ combine to form a resultant with magnitude $H_m$ and direction $\theta$. Referred to a 2-phase, single pole-pair motor with synchronous rotor, orthogonal components $H_x$ and $H_y$ respresent the respective magnetic field intensities of orthogonally positioned stator windings with respective currents $I_m\cos\theta$ and $I_m\sin\theta$, produced by systems means wherein $\theta$ is the rotor field angle relative to the stator. Interaction of the resultant stator field and the rotor field causes a torque proportional to their product which tends to align them. Since the system is arranged so the resultant stator field is always displaced 90° from the rotor field, the motor operates at a 90° torque angle and unity power factor.

This principle is readily seen to be applicable to all polyphase synchronous motors with $N_\phi$ phases of two or more and $N_p$ pole-pairs of one or more, wherein the resultant stator field is displaced 90°/$N_p$ mechanically from the rotor field.

Secondly, this invention is based on a fundamental principle of switching regulators, supplied with constant Dc voltage $V_{dc}$ and controlling balanced and undistorted sinusoidal polyphase currents at unity power factor so that total power $P_t$ is exchanged: The sum of the currents, averaged over several switching cycles, to or from said plurality of switching regulators, is constant and approximately equal to $P_s/V_{dc}$. Pulse currents from each switching regulator can be characterized by ripple components at the power switching frequency $f_s$, its sidebands $f_s + 2 N_p \dot\theta$ and $f_s - 2 N_p \dot\theta$, harmonics $2f_s, 3f_s$, etc., and their sidebands, wherein $N_p \dot\theta$ is the electrical frequency of rotation. The lowest frequency component of ripple current is near $f_s$. Selected frequency components of the summed currents can be reduced by time-staggering or phasing such pulse currents, so that their sum is appreciably less than that resulting from non-staggered timing. Insofar as the components near $f_s$ are the lowest frequency and largest amplitude, it can be seen that optimum time-staggering can be achieved by 180° relative phasing of pulses from two summed sources, 120° with three, 90° with four, etc., and 360°/$N_\phi N_p$ in general.

Accordingly, a motor and controller system is herein described that achieves inherent unity power factor polyphase operation, that maintains undistorted sinusoidal stator currents over its entire broad speed range, that achieves time-staggered power switching to control said currents at rates 10 to 100 times the practical limit of known inverters for motor control systems, and achieves a ratio of effective sinusoidal voltage to ripple voltage which is double that of known inverters for motor systems.

Furthermore, system configuration and control logic means are described that insure optimum system response to all external commands regardless of existing motor speed and direction or mechanical load.

These improvements to the art, plus other features and advantages, will be apparent from the following description of this invention when considered in conjunction with the accompanying drawings wherein.

Figure 3:
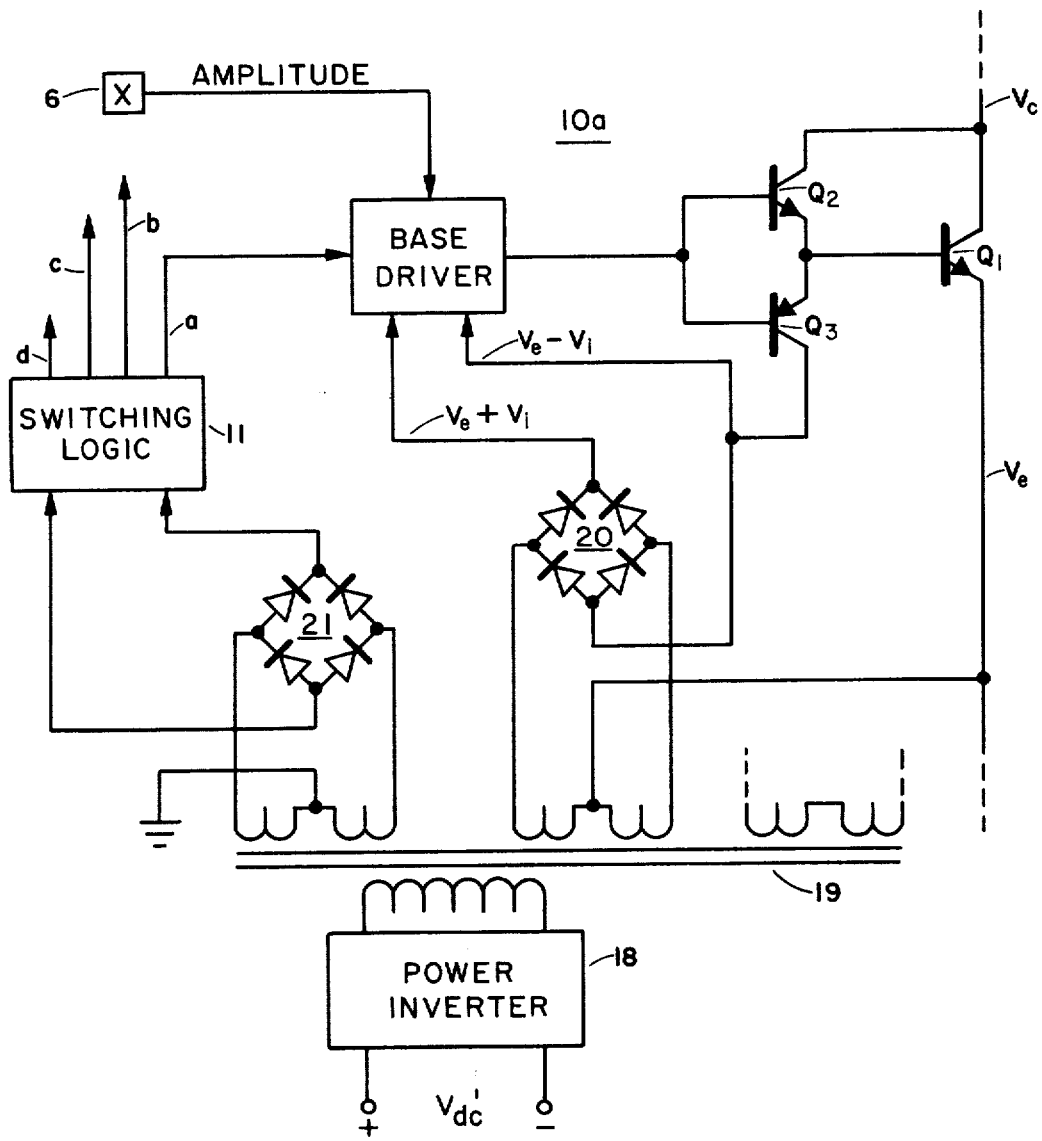
Figure 4:
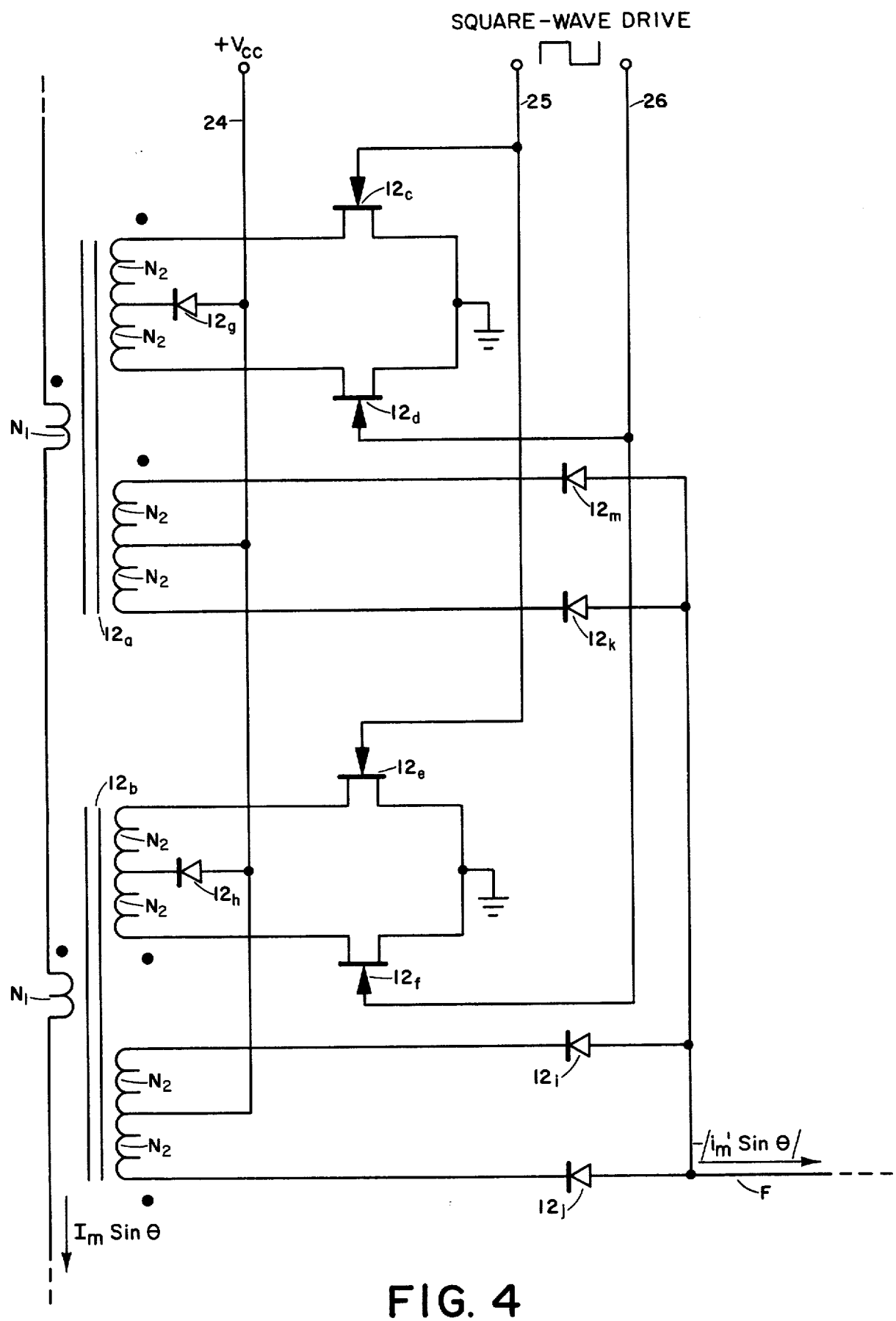
Figure 5:
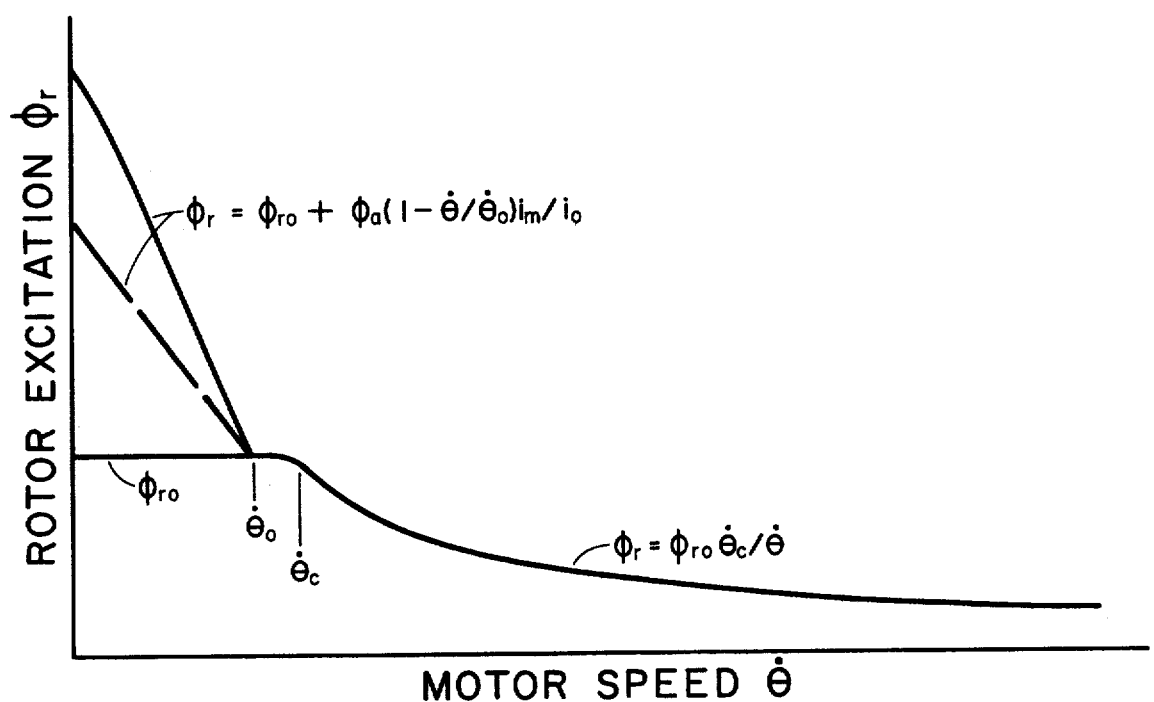
Figure 6:
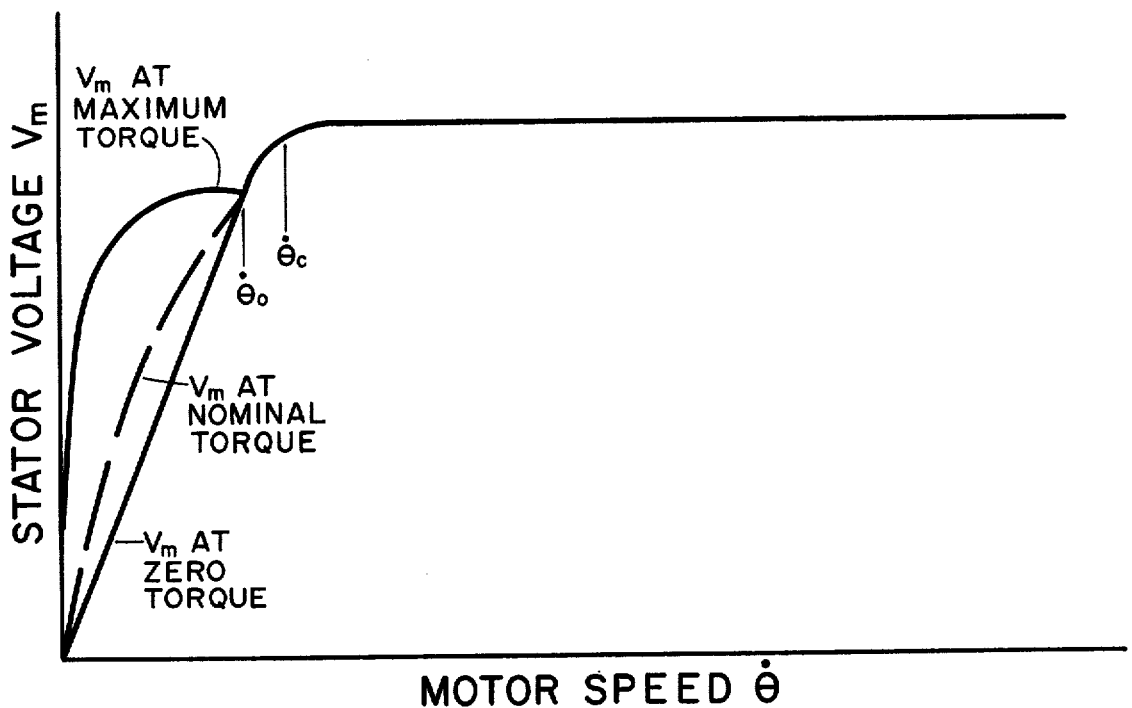

FIG. 3 shows the essential features of typical power switch 10a, its power source, and interconnection to multiplier 6 and switching logic 11;

FIG. 4 shows a simplified schematic of the preferred embodiment of current sensor 12;

FIG. 5 shows rotor excitation $\phi_r$ vs. motor speed $\dot\theta$ at respectively zero, nominal, and maximum commanded fractional stator current $i_m/i_o$ (i.e., torque demand);

FIG. 6 shows stator voltage $V_m$ vs. motor speed $\dot\theta$ at respectively zero, nominal, and maximum commanded fractional stator current $i_m/i_o$.

DESCRIPTION OF THE INVENTION

Figure 1:
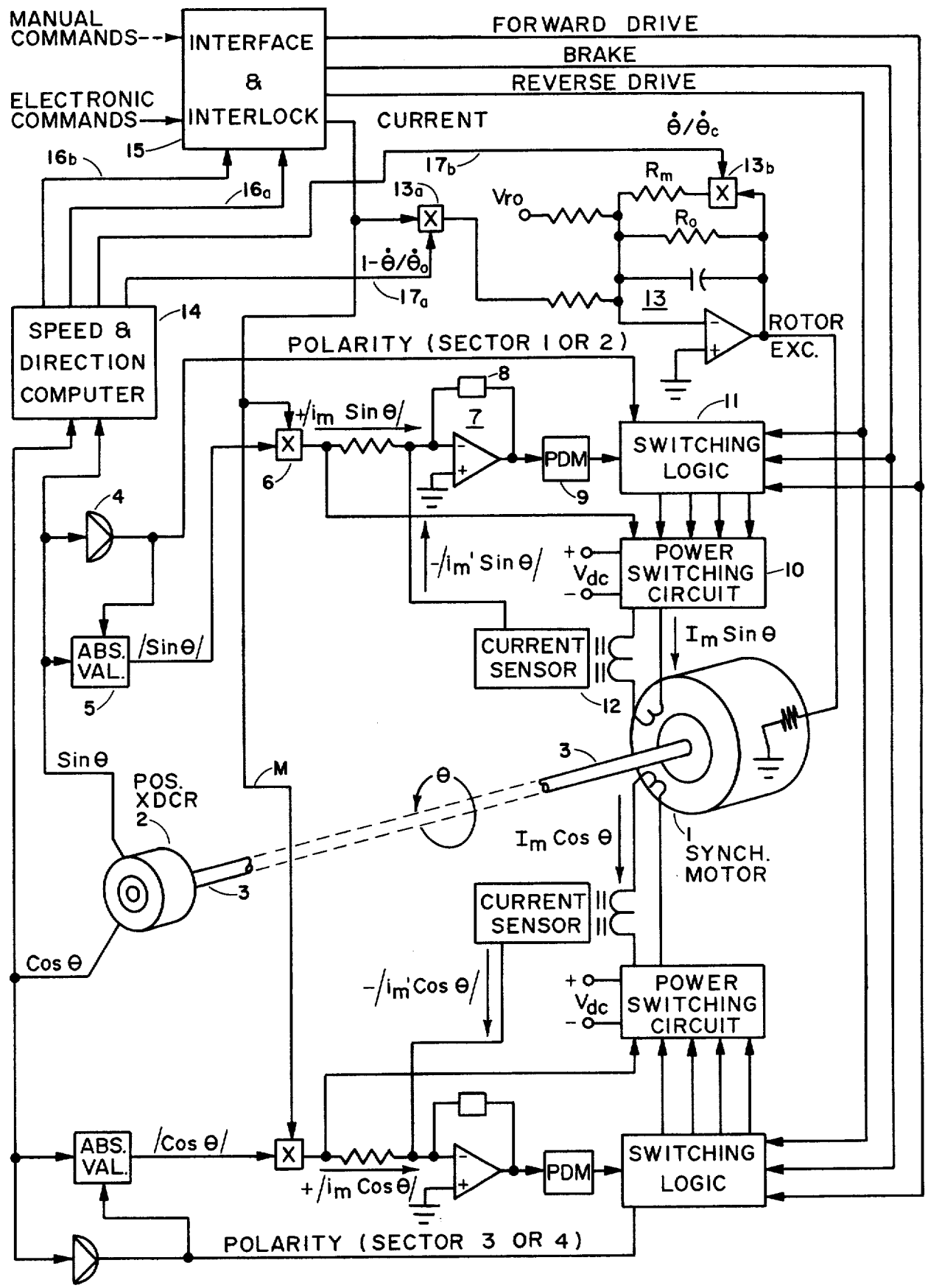
FIG. 1 shows a simplified block diagram of a motor and controller system which illustrates the simplest composite embodiment of this invention.

The composite system is herein briefly described by way of reference to the basic system shown on FIG. 1, followed by detailed descriptions of its component elements and general variations:

Referring to FIG. 1, the rotor of synchronous 2-phase, 2-pole (i.e., one pole-pair) motor 1 is coupled to the rotor of position transducer 2 and to a mechanical load or inertia not shown thereon by rotor shaft 3 so that all elements coupled thereto revolve together through electrical angle $N_p\theta$ and mechanical angle $\theta$. The fixed stators of motor 1 and transducer 2 are stationary relative to each other.

Position transducer 2 provides signals $\sin\theta$ and $\cos\theta$ which are processed identically in their respective phase control channels. Attention is directed to the phase control channel associated with $\sin\theta$, whose component elements and their respective functions are identical in the one (or more) other phase control channel(s) of the motor and controller system.

Signal polarity is extracted by comparator 4. It identifies one of two rotor position sectors for each phase, which facilitates digital logical control. For the $\sin\theta$ control channel; sector 1 spans values of $\theta$ from 0° to 180°; sector 2 spans 180° to 360°. Sectors for the $\cos\theta$ channel are displaced 90° from these; with sector 3 spanning −90° through 0° to +90°, and sector 4 spanning 90° through 270°.

Absolute value circuit 5 extracts relative signal amplitude /$\sin\theta$/. This facilitates single-quadrant multiplication and pulse duration modulation.

Multiplier 6 provides the product of /$\sin\theta$/ and analog variable $i_m$ on line M corresponding to desired torque and/or stator current $I_m$.

Analog product /$i_m \sin\theta$/ serves as the input command level to the servo loop that controls stator current for the $\sin\theta$ control channel; said servo loop comprised of operational amplifier 7 and loop compensation network 8, pulse duration modulator (PDM) 9, power switching circuit 10, switching logic 11, and current sensor 12; and also serves as a control signal from which proportional base drive current for switching circuit 10 is obtained.

DC rotor excitation for motor 1 is controlled by operational amplifier 13, which at speeds between standstill and $\dot\theta_o$ provides excitation to cause rotor field strength $\phi_r = \phi_{ro} + \phi_a(1 - \dot\theta/\dot\theta_o) i_m/i_o$, and which at speeds above $\dot\theta_c$ (wherein $\dot\theta_c$ is nominally equal to $\dot\theta_o$) causes rotor field strength $\phi_{ro}/(1 + \dot\theta/\dot\theta_c)$. This affords a maximum torque for the power-handling capability of a particular system, with very high torque at low speeds and constant stator voltage at high speeds.

Speed and direction computer 14 provides two or more analog signals which vary in accordance with motor speed, for adaptive rotor excitation as provided in conjunction with operational amplifier 13 and for several functions that may be performed by interface and interlock 15 which serve to adapt this system to various applications.

Attention is now directed to each component element hereinabove mentioned, to further clarify their function and establish their nature, form, identity, or mechanization and preferred embodiment:

Motor 1 has a synchronous rotor, preferably capable of variable magnetic field strength as effected by DC rotor excitation to homoplanar windings attached to the stator structure, with a contactless rotor so formed as to achieve the requisite pole pattern from said DC excitation. Such embodiments are known to those versed in the art. Conventional wound rotors supplied exciting current via slip-rings are suitable for most applications excepting those requiring the very high speed capability with negligible friction that is better met by the contactless types. Permanently magnetized rotors are suitable for applications not requiring the high torque of the two aforementioned types, and wherein long-term eddy and magnetic hysteresis energy losses from a highly magnetized rotor idling at high speed is acceptable, and wherein stator voltage proportional to speed is also acceptable.

Although a 2-phase, 2-pole motor 1 is illustrated and its operation described to facilitate explanation of the basic system, it will become apparent that $N_\phi$ phases of three or more, $N_p$ pole-pairs of two to twenty, and accessibility to a plurality of $N_s$ windings in common slots affords means to achieve power capability with transistor power control well beyond that heretofore achieved, using the power switching circuit 10 hereinafter described. It is readily seen that the electric power converted by such motor systems is approximately $N_sN_\phi N_p V_m I_m/2$, where $V_m$ and $I_m$ are the maximum voltage and current available for each winding. From this, and consideration of the power switching circuit 10, it will be seen that practical values of $V_m$ and $I_m$ with available components are on the order of 200 volts and 50 amperes, so a practical motor with $N_s=2$, $N_\phi=3$, and $N_p=5$ would be limited by circuit 10 with presently available components to about 150 kilowatts power-handling capability.

It will be appreciated that motor 1 configurations other than those wherein the wound stator surrounds the rotor are applicable to this invention; and for such applications as electrically coupled flywheels, turntables, tape reel drives, motorized wheels, and the like, there are advantages to physical configurations wherein the stator (with its hard-wired electrical connections) is placed so the rotor revolves outside it, in what is known as an "inside-out" configuration.

A preferred embodiment of position transducer 2, known to those versed in the art, is comprised of one or more Hall-effect semiconductors per phase, affixed to the transducer stator and furnished constant DC current (not shown herein); including an appropriately formed permanent magnet rotor coupled to shaft 3, so that said Hall sensors provide signal voltages for each phase which vary sinusoidally with rotor position. Another embodiment of position transducer 2 suitable for many applications is the well known and widely used synchro, a rotatable transformer with variable rotor coupling to stator windings corresponding (or geared to correspond) to those in motor 1; including AC excitation supplied via slip-rings or via a contactless rotor configuration known in the art, synchronous demodulators, and signal filters (also not shown herein). Bandwidth limitations imposed by the carrier frequency can restrict synchro use to relatively low rotational speeds, whereas Hall sensors can accommodate essentially unlimited speed.

Comparator 4 is a commonly used integrated semiconductor device which essentially functions as a fast, high-gain amplifier with a zero reference differential input signal.

Absolute value circuits (also called full-wave signal rectifiers) are well known in the art. However, since polarity of sinusoidal signals is available from comparator 4 and other comparators so disposed in all embodiments of this invention, a well known full-wave demodulator circuit comprised of one operational amplifier, two chopper transistors, and several resistors, is the best mode contemplated to mechanize absolute value circuit 5.

Packaged devices are commercially available to constitute multiplier 6. However, since only single-quadrant multiplication is required and all embodiments of this invention have a triangular waveform present that can facilitate pulse duration modulation of the commanded analog $i_m$, which can gate signal amplitudes at a rate $f_s$ and duration $T_s$ proportional to $i_m$, to obtain the effective product $/f_sT_s\sin\theta/$ proportional to $/i_m\sin\theta/$ which is readily filtered, a preferred embodiment of multipliers used therein is comprised of one comparator that provides variable pulse duration gating to signal choppers in each phase control channel.

Mechanization of operational amplifier 7 is well known in the art. Integrated circuit amplifiers for use therein are widely used. Amplifier feedback network 8 effects compensation to assure a stable servo loop that responds as required and does not oscillate, filters ripple accompanying the commanded amplitude and the feedback signal from current sensor 12, and serves to limit the amplifier to its linear range during sector or command transitions.

Pulse duration modulator (PDM) 9 is completely constituted by a comparator, identical to comparator 4. One of its differential signal inputs is the amplifier 7 output; the other is a triangular waveform supplied to each PDM at one of a plurality of $N_\phi N_p$ phases. Said triangular waveforms are obtained by approximate integration of $N_\phi N_p$-phase square-waves. The oscillator, countdown, logic, and shaping circuits which provides time-staggered triangular waveforms, and their connection to each PDM are not shown, as their detailed mechanization is familiar to those versed in the art.

Figure 2:
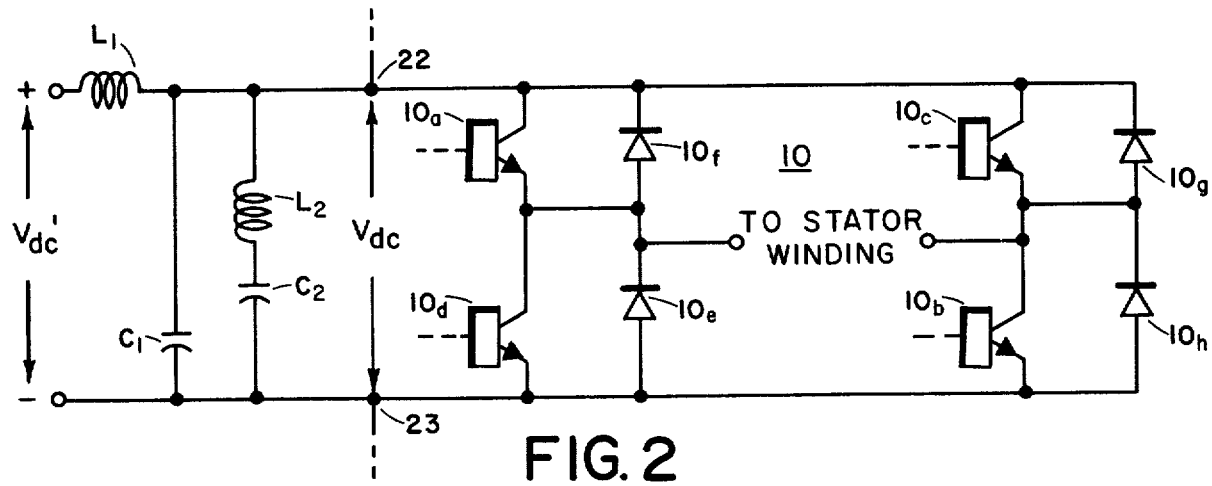
FIG. 2 shows a simplified schematic illustrating the basic operation of one of a plurality of power switching circuits 10, and its interconnections.

Simplified schematic FIG. 2 shows power switching circuit 10, constituted by four power switches 10a, 10b, 10c, and 10d which cooperate with free-wheeling power rectifiers 10e, 10f, 10g, and 10h to control current in the associated stator winding of motor 1. Said power switches are controlled by switching logic 11, with amplitude control signals for proportional base drive provided by multiplier 6. Supply voltage $V_{dc}$ serves as a power source when motor 1 is driven and power sink when motor 1 is regeneratively braked.

Basically, switching circuit 10 alternately presents to the stator winding voltages approximating $V_{dc}$ and zero at a switching rate $f_s$, which is about 100 kilohertz. When the motor is driven, $V_{dc}$ is present for variable pulse duration $T_{on}$, and zero voltage is present for the remainder of the switching period. Conversely, when regeneratively braked, stator winding voltage is zero for $T_{on}$ and $V_{dc}$ for $1/f_s - T_{on}$. Therefore, the effective stator winding voltage (which at unity power factor is $V_m\sin\theta$ for stator current $I_m\sin\theta$) is $V_{dc}T_{on}f_s$ when motor 1 is driven and $V_{dc}(1 - T_{on}f_s)$ when regeneratively braked. PDM 9 varies $T_{on}$ to satisfy to servo loop requirement that stator winding current $I_m\sin\theta$ follows commanded analog $/i_m\sin\theta/$ and switching logic 11 furnishes gating that responds to binary signals corresponding to polarity, and forward, brake, and reverse commands.

Conduction status of each power switch 10a, 10b, 10c, and 10d is related to said binary and pulse duration signals in accordance with the schedule in TABLE I shown below:

TABLE I

| POWER SWITCH | FORWARD DRIVE | | REGEN. BRAKE | REVERSE DRIVE | |
|---|---|---|---|---|---|
| | SECTOR 1 | SECTOR 2 | | SECTOR 1 | SECTOR 2 |
| 10a | $T_{on}$ | OFF | OFF | OFF | $T_{on}$ |
| 10b | ON | OFF | $T_{on}$ | OFF | ON |
| 10c | OFF | $T_{on}$ | OFF | $T_{on}$ | OFF |
| 10d | OFF | ON | $T_{on}$ | ON | OFF |

In TABLE I, $T_{on}$ denotes that the power switch conducts for fractional time $T_{on}$ in period $1/f_s$; ON denotes the power switch is conducting; OFF denotes the power switch is nonconducting.

Switching logic for other phases is identical to TABLE I, with appropriate sectors designated for each phase.

It can be seen that current fluctuation in stator windings with inductance $L_s$, within successive switching intervals of period $1/f_s$ will be less than $V_{dc}/f_sL_s$, which will be relatively small.

Hence, current from switching circuit 10 to nodes 22 and 23 is basically a sequence of square pulses with amplitude $I_m\sin\theta$ and duration $T_{on}$ when motor 1 is driven, and duration $1/f_s-T_{on}$ when regeneratively braked, Said pulse durations are approximately $V_m\sin\theta/V_{dc}f_s$. So effective current from each switching circuit $10,_2$ averaged over several pulses, to nodes 22 and 23 is $I_m(\sin\theta)^2V_m/V_{dc}$.

As shown on FIG. 2, nodes 22 and 23 connect to corresponding lines of like power switching circuits, and to a common reactive power filter such as that comprised of inductors $L_1$ and $L_2$ with capacitors $C_1$ and $C_2$. Neglecting resistance in $L_1$, line voltage $V_{dc}$ to switching circuit 10 has the same average value as filtered voltage $V_{dc}'$. For the 2-phase system of FIG. 1, total current through $L_1$ averaged over several switching periods $1/f_s$ is essentially $I_m(\sin^2\theta + \cos^2\theta)V_m/V_{dc}$ which is readily seen to be equal to $I_mV_m/V_{dc}$. For a general polyphase system, it is also readily seen that the sum of such currents is $N_2N_4N_pV_mI_m/2V_{dc}$. Said current is the sum of interlaced time-staggered pulses, in accordance with the time-staggered gating provided; whose combined ripple is absorbed by shunt reactive filter elements such as $C_1$ and resonant pair $L_2C_2$.

It will be appreciated from consideration of FIG. 2 and TABLE I that peak-to-peak pulse voltages across stator windings are equal to the maximum value of $V_m$ which is essentially $V_{dc}$, whereas pulse voltages across stator windings are more than double this for comparable $V_m$ with other known inverters used for motor control.

FIG. 3 shows a simplified circuit of typical power switch 10a, which includes transistors $Q_1$, $Q_2$, $Q_3$, and a base driver circuit.

$Q_1$ conduct the bulk of the current carried by this switch. An NPN transistor is shown for $Q_1$ in switch 10a to illustrate the means by which circuits such as this are supplied floating power at their common-mode voltage $V_e$, although PNP types are preferred here if available, so their emitters can be connected in common to the positive line, thereby minimizing the number of separate floating supplies required for their base drive. Transistors are available with 100 ampere, 400 volt ratings; which need not be capable of fast switching and fast recovery from saturation because transistor $Q_1$ is never driven into saturation in switch 10a, and need not have low base capacitance because ample current is available for both drive and turn-off by $Q_2$ and $Q_3$, respectively.

For most applications, transistors are available with the fast switching requirements of $Q_2$, so in the preferred embodiment of switch 10a, $Q_2$ functions as a fast switching transistor with Darlington connection to $Q_1$. It is readily seen that $V_c-V_e$, the switch conduction drop, is the $Q_1$ base-to-emitter voltage plus the $Q_2$ collector-to-emitter saturation voltage when switch 10a is conducting, and is no more than the voltage drop of a conducting thyristor used in inverters with motors of equivalent power. In cases wherein transistors available for $Q_2$ do not have requisite fast recovery from saturation, $Q_2$ base current is clamped by a fast diode connected between its base and collector; or $Q_2$ is driven so it does not saturate, by an additional Darlington-connected transistor of requisite switching speed.

Emitter-follower $Q_3$ provides active base pull-down at ample current capability to within rated reverse base-to-emitter voltage of $Q_1$, to achieve fast $Q_1$ turn-off. Additional Darlington stages have like active turn-off.

Power inverter 18 supplies power through transformer 19 to individual rectifiers such as bridge rectifier 20, which furnishes floating voltages $V_e+V_i$ and $V_e-\lambda V_i$, where $V_i$ is normally a few volts. Circuits referred to system ground, such as multiplier 6 and switching logic 11, are supplied by rectifier 21.

The base driver of switch 10a provides current pulses of duration $T_{on}$ at rate $f_s$ and nominal amplitude 0.001 $I_m\sin\theta$ to $Q_2$. Gating is obtained from switching logic 11 via line a, and amplitude from multiplier 6. Lines b, c, and d from switching logic 11 provide gating for power switches 10b, 10c, and 10d, respectively, which are not shown. Signals from multiplier 6 and switching logic 11 are preferably transmitted to the base driver of switch 10a by direct differential transistor coupling. In such cases that common-mode voltage is excessive for practical available signal transistors, commonly used optoelectronic isolators can provide requisite signal transmission to the base driver circuits.

Switches 10a, 10b, etc. are capable of switching transition times of 0.1 microsecond. Power rectifiers are available for 10e, 10f, etc. with recovery times under 0.1 microsecond. It is noteworthy that with such components in power switching circuit 10, switching rate $f_s$ of nominally 100 kilohertz is practical, efficient, and reliable. This rate is 10 to 100 times the highest practical switching rate of thyristor inverters used for motor control in the same power range. Hence, all inductance and capacitance required for reactive power filtering can be 1 to 10 percent that heretofore needed. Inductors heretofore generally required in series with each stator winding to limit di/dt (and stator current fluctuations within pulse intervals) are not normally required with the high switching rate afforded by switching circuit 10, as stator winding inductance is normally sufficient. Moreover, the high ratio of constant $f_s$ to variable electrical frequency of rotation $N_p\dot\theta$ permits effective use of resonant filters to provide high shunt admittance at specific frequency bands, such as $L_2C_2$ in FIG. 2, which can absorb the major component of ripple such as that at $f_s$ and its sidebands with substantially smaller total filter size than a shunt capacitor $C_1$ alone.

Switching logic 11 performs straightforward digital logic, by means of well known configurations of widely used digital integrated circuits, on binary variables corresponding to forward drive, brake, and reverse drive commands, rotor position sector, and the pulse train from PDM 9.

Current sensor 12 provides a negative feedback signal $-/i_m'\sin\theta/$ for the servo loop, which is proportional to the absolute value of stator current $I_m\sin\theta$. Said feedback signal is isolated from stator voltages, preferably by inductive coupling that has negligible effect on the stator circuit.

Hall-effect devices for sensing currents whose frequencies range from zero to relatively high values are known in the art. For this system, such devices would include a stable source of current for the Hall sensors, ferromagnetic cores with gaps matching Hall sensor dimensions, and absolute value amplifiers.

A preferred embodiment of current sensor 12, whose operation is herein explained with reference to FIG. 4, is comprised of standard and readily available components whose properties are well known. It utilizes $+V_{cc}$ of 10 to 20 volts on line 24 and a complementary square-wave drive of nominally 100 kilohertz on lines 25 and 26. Ferromagnetic cores 12a and 12b are identical, with very high permeability and abrupt saturation. Two coils with $N_2$ turns at each side of their center-taps are wound on each core. A conductor which carries stator current $I_1 = I_m \sin\theta$ is linked to both cores by $N_1$ turns. Coil winding direction and relative voltage polarities are indicated on FIG. 4 by dots adjacent to coil symbols. With exciting current per turn essentially negligible compared to $I_1/N_1$, unless a core is saturated, the summed ampere turns of coils linking it is practically zero. For example, when field-effect transistor (FET) 12c is ON, current $I_1 N_1/N_2$ flows from $+V_{cc}$ through diode 12g to the center-tap through $N_2$ turns and through FET 12c to ground, satisfying the core requirement of negligible exciting current. During the alternate half-cycle, when FET 12c is OFF, current $I_1 N_1/N_2$ flows from line F (at virtual ground potential) through diode 12k through $N_2$ turns to $+V_{cc}$, since this path alone is not blocked and can satisfy said requirement of unsaturated core 12a. Coil voltage per turn is $(V_{cc} - V_f)/N_2$ during the first described half-cycle and $(V_{cc} + V_f)/N_2$ at reverse polarity during the alternate half-cycle until core 12a saturates. $V_f$ is the typical voltage drop across diodes such as 12g, etc. during forward conduction. Cores 12a and 12b are thereby saturated for a fraction $2V_f/(V_{cc}+V_f)$ of alternate half-cycles. With $V_{cc}= 20$ v and $V_f= 0.5$v, about 5% of the average output signal on line F is lost during core saturation, so $i_m'$ is about $(0.95\ N_1/N_2)I_m$. It is appreciated that diode 12i conducts signal current for each half-cycle, alternately with diode 12k, when stator current $I_1$ direction is as shown by the arrow on FIG. 4 (into the dotted side of coil $N_1$). When $I_1$ is reversed, diodes 12m and 12j conduct during alternate half-cycles in a like manner.

Field-effect transistors have a better defined current limiting than bipolar transistors, and are selected such that current would begin self-limiting above $I_m N_1/N_2$. However, with a slightly more complicated circuit, current to diodes 12g and 12h could be limited and their anodes biased at $+V_f$ to $+2V_f$ relative to line 24, thereby obviating the requirement that transistors have inherent current limiting, and affording almost balanced square-wave voltage and consequently almost negligible core saturation.

Referring again to FIG. 1, operational amplifier 13 provides control to achieve rotor excitation $\phi_r$ approximately equal to $\phi_{ro} + \phi_a(1-\dot\theta/\dot\theta_o)i_m/i_o$ at speed below $\dot\theta_o$, that essentially responds to torque demand as dictated to amplifier 13 by fractional commanded stator current $i_m/i_o$ from line M, multiplied by analog speed variable $(1 - \dot\theta/\dot\theta_o)$ from line 17a by means of multiplier 13a. Rotor excitation at said low speed, with zero torque demand (i.e., $i_m = o$) is essentially $\phi_{ro}$ as dictated by reference signal $V_{ro}$. In effect, $\phi_a$ is the maximum additional rotor excitation resulting from torque demand.

At motor speed $\dot\theta$ above $\dot\theta_c$, wherein $\dot\theta_c$ is equal to or slightly above $\dot\theta_o$, rotor excitation $\phi_r = \phi_{ro}/(1 + \dot\theta/\dot\theta_c)$ approaches $\phi_{ro}\dot\theta_c/\dot\theta$ at high speed, thereby maintaining maximum stator voltage near but never reaching $V_{dc}$ so that servo loop control and sinusoidal stator currents are maintained over the entire speed range. Amplifier 13 output to achieve rotor excitation $\phi_r = \phi_{ro}/(1 + \dot\theta/\dot\theta_c)$ is obtained from speed signal $\dot\theta/\dot\theta_c$ on line 17b to multiplier 13b in the amplifier 13 feedback circuit.

The combined effect of commanded stator current $i_m$, and motor speed analogs $(1 - \dot\theta/\dot\theta_o)$ and $\dot\theta/\dot\theta_c$ on operational amplifier 13 output is graphically illustrated on FIG. 5, wherein rotor excitation $\phi_r$ is shown vs. motor speed $\dot\theta$. It is noteworthy that torque vs. motor speed curves are identical to those shown on FIG. 5 when $I_m$ is constant (e.g., at its maximum value for the components selected). It will be appreciated that, at low speed and for a given maximum stator current $I_m$, means are thus provided to achieve torque of double, triple, or more than that from brushless motor systems heretofore known that maintain sinusoidal stator voltages as speed increases. On FIG. 6, resultant stator voltage $V_m$ vs. motor speed $\dot\theta$ is illustrated for the motor excitation so provided by amplifier 13. It will be appreciated that the nonsinusoidal operation heretofore commonly incurred at high speeds due to voltage limiting is thus prevented.

A preferred embodiment of operational amplifier 13 and the best mode contemplated to obtain its input variables is set forth hereinbelow:

Single-quadrant multipliers 13a and 13b are constituted by gated signal choppers identical to those used for multiplier 6. Complementary gating (blanking) control $(1 - \dot\theta/\dot\theta_o)$ is obtained from a commonly used one-shot multivibrator that provides $2N_\phi N_p \dot\theta$ blanking pulses per revolution, of fixed duration $1/2N_\phi N_p\dot\theta_o$, each time it is triggered by a rotor position sector transition, with trigger signals from comparator 4 and corresponding comparators for each phase. Said blanking causes DC analog variable $i_m$ to be replaced by a zero value for duration $\tfrac{1}{2}N_\phi N_p\dot\theta_o$ in variable period $\tfrac{1}{2}N_{100}N_p\dot\theta$ such that the average signal so presented to amplifier 13 is $i_m(1 - \dot\theta/\dot\theta_o)$ which decreases linearly with increasing speed $\dot\theta$ until $\dot\theta$ equals or exceeds $\dot\theta_o$, for which $i_m$ is essentially blanked continuously (i.e., blanking pulses overlap). The feedback signal through multiplier 13b is conversely gated ON for fixed pulse duration $R_m/2N_{100}N_p\dot\theta_c R_o$ each period $\tfrac{1}{2}N_\phi N_p\dot\theta$. It is readily seen that rotor excitation is then $\phi_r = \phi_{ro}/(1 + \dot\theta/\dot\theta_c)$ above rotational speed $\dot\theta_c$, and approaches $\phi_r = \phi_{ro}\dot\theta_c/\dot\theta$ for large $\dot\theta/\dot\theta_c$, thereby maintaining constant stator voltage $V_m \sin N_p\theta$, independent of speed.

Speed and direction computer 14 provides appropriately conditioned speed and direction signals on lines 16a and 16b, respectively, in a variety of forms suitable to each particular application of this motor and controller system. In conjunction with interface and interlock 15, said signals are used to control interposed regenerative braking whenever the motor drive command is reversed. If the motor and controller system is used in a speed-controlled servomechanism configuration, a speed signal may serve as a negative feedback for comparison with the commanded speed. The speed signal on line 16a may variously include forms such as pulses occurring at each rotor sector transition, a variable DC analog derived from pulse rate, and the time-derivative of sinusoidal signals from transducer 2. Direction and angle of rotation on line 16b is obtained by known digital logic means using binary variables denoting rotor position sectors. Said means provide a pulse at each sector transition from one of two output lines corresponding to forward and reverse rotation increments, respectively. Position data can be derived from a tally of said pulses, by one of various commonly used up-/down counters. High-resolution position data is available from relative amplitude of sinusoidal signals from transducer 2, in combination with sector data and said tally.

Interface and interlock 15 may include manual controls coupled to signal producing means; circuits to receive control signals from external electronic devices; translator, comparator, logic, and memory means to convert possibly ambiguous manual control settings and/or external control signals into unambiguous internal commands, according to priorities established by said logic and motor speed and direction. Numerous mechanizations are known that provide means to accomplish such tasks.

By way of example, for application to vehicle propulsion, translator means convert manual switch and level settings and/or external electronic control signals to one of three internal binary commands (forward, brake, reverse) and one internal amplitude command (a stator current analog on line M). Override priorities are established so external commands, possibly in conflict with each other, result nevertheless in unambiguous internal commands. Additionally, speed and direction data are used to control a regenerative braking cycle which is automatically interposed whenever a motor drive command is initiated in a direction opposite to motor rotation. Said interposed regenerative braking continues at maximum torque until the motor speed is reduced to practically zero, at which time the command that initiated said braking is executed.

A preferred embodiment for said propulsion application includes a lever with "forward" and "reverse" positions, which can set or reset, respectively, a gated bistable latching circuit, whose response to said set/reset commands can be inhibited by the binary output signals of a comparator (for which one input signal is a reference corresponding to practically zero speed and the second input signal is a speed analog from line 16a) and a bistable circuit (set and reset by pulses corresponding to forward and reverse rotation, respectively, from computer 14); plus an "acceleration" control lever with spring return, which can push a mechanical coupling to a variable transformer with spring return, whose rectified output serves as the amplitude command on line M; and a "brake" control lever with spring return, which can also push said mechanical coupling (and thereby also control the analog signal on line M); also digital logic, which provides one of three internal binary commands according to the "forward/reverse" lever and "brake" lever positions, and said gated bistable output signal. As a result, neither forward nor reverse internal commands are initiated in response to an external command unless or until the motor is rotating in the same direction as said external command or its speed is practically zero; and regenerative braking at maximum torque is interposed unless or until either condition is satisfied, whenever such external commands are received. Also, internal drive commands are negated by brake commands. It is appreciated that particular applications will determine certain choices in a specific embodiment: For instance, said variable transformer may instead by mechanized by two, each coupled to individual levers; or instead by a single "forward/brake/reverse" lever controlling a synchronously demodulated variable transformer and appropriate logic; or by one or two potentiometers with corresponding differences of mechanical coupling. Likewise, pulse rates or other appropriate signal forms may be used instead of DC analog variables.

By way of another example, for application to a position control servomechanism, means are included to translate command position data; tally direction pulses from computer 14 (and perhaps interpolate from relative amplitudes of sinusoids for high-resolution position data); interpose regenerative braking as hereinabove described; and perhaps determine optimum switchover from drive to braking (for the well known ideal servo response to a step-change position command, which achieves minimum transit time for given torque).

By way of yet another example, for application to a constant-voltage electrically coupled flywheel energy storage system, an operational amplifier is included to compare $V_{dc}$ with a voltage reference; said amplifier output providing the analog signal for line M. In this application, a unidirectional drive command corresponds to "deposit energy" and the regenerative braking command corresponds to "withdraw energy" in accordance with external requirements. Said commands may alternatively be internally derived by means incorporated into the motor and controller system, wherein a braking command is initiated whenever $V_{dc}$ drops a set amount below the regulated voltage level, and a drive command (with speed-sensitive lockout to prevent excessive speed) when $V_{dc}$ is a set amount above it.

It will be appreciated that this invention may have many other variations in addition to those described by example herein, with appropriate embodiments of the motor and controller system herein described to best suit a particular application. Accordingly, it is intended that the claims as set forth hereinafter cover all such applications, embodiments, and variations thereto within the true spirit and scope of this invention.

I claim as new and a significant improvement to the prior art, and desire to secure by letters patent of the United States:

1. A system for providing controlled variable-speed motor and generator action; including in combination
   a synchronous polyphase machine comprising a stator with a plurality of windings and a cooperating rotor that dictates the angle of a magnetic field which rotates therewith;
   transducer means for providing polyphase rotor position signals, each varying sinusoidally in accordance with rotor position, with respective phases corresponding to the stator windings;
   means for deriving from each said rotor position signal analog and binary signals representing the instantaneous absolute value and polarity thereof;
   means for providing an amplitude control signal and binary drive and brake commands;
   a plurality of single-quadrant multiplier means, each responsive to a corresponding absolute value signal and to said amplitude control signal, for providing synchronized amplitude control signals;
   a plurality of servo loop means for controlling current of each stator winding in compliance with the corresponding synchronized amplitude control signal, the corresponding binary polarity signal, and said binary drive and brake commands.

2. In a system according to claim 1, means for providing said binary drive and brake commands; comprising
   means for providing forward drive, brake, and reverse drive request signals;
   gating means for presenting only one of said request signals at any time in accordance with predetermined gating logic;

rotation discriminator means for providing binary forward and reverse rotation signals respectively indicating forward and reverse rotation exceeding a threshold speed;

drive logic means for providing respective forward and reverse binary commands in response to like request signals are not opposite to rotation signals;

brake logic means for providing a binary brake command when a brake request signal is present and when a drive request signal is present that is opposite to the rotation signals.

3. In a system according to claim 1, including a flywheel coupled to the rotor and a variable current source and variable load connected to respective positive and negative power interface terminals of the system, circuit means for providing said amplitude control signal and binary drive and brake commands; comprising means for providing reference signals proportional to the desired voltage of said terminals;

means for providing feedback signals proportional to the actual voltage of said terminals;

amplifier means for providing said amplitude control signal, representing the absolute value of the amplified difference in excess of a predetermined threshold, between said reference and feedback signals;

comparator means for providing said binary brake command when said reference exceeds said feedback by an amount in excess of a predetermined threshold and for providing a binary drive signal when said feedback exceeds said reference by said amount;

speed discriminator means for providing a binary signal indicating whether rotor speed is above or below a predetermined limit;

digital logic means, responsive to said drive signal and to the speed discriminator signal, for providing said drive command when the drive signal is present and speed is below said limit.

4. In a system according to claim 1 circuit means for controlling current in a winding of said machine that dictates rotor excitation; comprising means for providing a reference input signal;

means for modulating said amplitude control signal by a signal which varies as a function of rotor speed, thereby providing an input signal which varies in proportion to the amplitude control signal and which decreases with increasing rotor speed;

means for multiplying a signal that is proportional to said excitation current by a signal that varies in proportion to rotor speed, thereby providing a negative feedback signal proportional to said excitation current and to speed;

operational amplifier means, responsive to said input signals and said feedback signal, for providing an output which dictates said excitation current.

5. In a system according to claim 4 circuit means for controlling current that dictates rotor excitation; wherein said means for modulating said amplitude control signal comprises a signal chopper in series with a resistor, the series pair connected to the negative input summing point of said operational amplifier means;

means for presenting said amplitude control signal in the form of an analog voltage to said series pair;

means for providing pulses of predetermined duration at a rate proportional to rotor speed;

means for controlling said signal chopper by said pulses whereby said chopper is conductive in the absence of a pulse and nonconductive for the duration of each pulse.

6. In a system according to claim 1, said plurality of current-control servo loop means; each comprising current sensor means for providing a loop feedback signal proportional to the absolute value of current through the associated stator winding;

operational amplifier means for providing an output signal representing the amplified difference between said synchronized amplitude control signal and said loop feedback signal;

pulse modulator means, responsive to the output of said operational amplifier means, for providing a high-frequency pulse train, switching with a variable time duration ratio between binary states;

switching logic means, responsive to said pulse train and to said binary signals representing polarity and drive and brake commands, for providing accordingly gated pulses to high-speed power switching means;

said high-speed power switching means, for effecting switching regulation and synchronous conversion to control current in the associated stator winding.

7. Current sensor means according to claim 6; each comprising two ferromagnetic cores, each wound with a center-tapped core reset winding and a center-tapped signal winding;

a coupling winding in series with the associated stator winding, having turns encircling both cores;

four transistors, each respectively connected to an end of a reset winding;

square-wave drive means for switching the transistors at opposing ends of a winding in phase opposition at high frequency;

DC voltage supply means connected to the center-tap of each signal winding and through a diode to the center-tap of each reset winding;

four signal diodes, each connected between respective ends of the signal windings and an output line.

8. Pulse modulator means according to claim 6; each comprising comparator means having two signal inputs, one connected to the output of the associated operational amplifier, the other to one of a plurality of multiphase high-frequency triangular waveform reference signals.

9. A plurality of high-speed power switching means according to claim 6; including in combination each of said power switching means, having a pair of stator terminals connected across an associated stator winding for controlling current therein, and a pair of pulse-power terminals connected across like terminals of each other power switching means and also across respective positive and negative terminals of reactive power filter means for exchanging high-frequency pulse train current;

said power filter means including a capacitor connected across said pulse-power terminals, also including positive and negative power interface terminals connected to an external power source and load for exchanging filtered current therewith.

10. High-speed power switching means according to claim 9; each comprising four power transistor and parallel free-wheeling rectifier pairs connected as a four-leg bridge, with said pulse-power terminals connected respectively to transistor and rectifier pairs between like sides of said pairs, said stator terminals connected respectively to transistor and rectifier pairs between complementary sides of said pairs;

means for switching the power transistors in one pair of oppposite legs, one transistor switched off and on at high frequency and the other transistor switched on, to control current of one polarity supplied to said winding, and for likewise switching the power transistors in the other pair of opposite legs, to likewise control current of the opposite polarity supplied to said winding, and for switching off and on at high frequency the power transistors in a pair of legs connected together at a pulse-power terminal, to control current taken from the winding.

11. High-speed power switching means according to claim 10; wherein means for switching said power transistors comprises base driver means, each responsive to gated switching signals from said switching logic means for time control and to said synchronized amplitude control signal of corresponding phase for amplitude control, for providing switching control current of variable duration and variable amplitude alternately with a pull-down voltage.

12. High-speed power switching means according to claim 10; wherein means for switching said power transistors comprises base driver means for providing switching control current alternately with a pull-down voltage;

associated driver stages, receiving said switching control current and pull-down voltage, each including a Darlington-connected transistor for providing non-saturating base drive to a power transistor, and a complementary transistor for alternately providing base pull-down for the power transistor;

inverter and rectifier means for supplying transformer-coupled DC power at relatively low voltage to said base driver means and driver stages.

* * * * *